(12) United States Patent
Kino et al.

(10) Patent No.: US 8,770,812 B2
(45) Date of Patent: Jul. 8, 2014

(54) SCUFF PLATE

(75) Inventors: Norihito Kino, Aichi-ken (JP); Satoshi Inagaki, Aichi-ken (JP)

(73) Assignee: Toyoda Gosei Co., Ltd., Nishikasugai-Gun, Aichi-Ken (JP)

( * ) Notice: Subject to any disclaimer, the term of this patent is extended or adjusted under 35 U.S.C. 154(b) by 661 days.

(21) Appl. No.: 12/385,137

(22) Filed: Mar. 31, 2009

(65) Prior Publication Data

US 2009/0251920 A1 Oct. 8, 2009

(30) Foreign Application Priority Data

Apr. 2, 2008 (JP) ................................ P.2008-095732

(51) Int. Cl.
*G09F 13/18* (2006.01)

(52) U.S. Cl.
USPC .......... 362/559; 362/23.17; 362/616; 362/613

(58) Field of Classification Search
USPC ............... 362/23, 26, 27, 362, 364, 495, 545, 362/546, 559, 565, 566, 602, 610, 612, 613, 362/615, 618, 620, 632, 800, 812, 23.16, 362/23.17, 616; 40/219, 546, 547, 40/564–570, 579, 580, 583
See application file for complete search history.

(56) References Cited

U.S. PATENT DOCUMENTS

| | | | | |
|---|---|---|---|---|
| 2,988,631 | A * | 6/1961 | Jordan et al. ..................... | 362/24 |
| 3,491,245 | A * | 1/1970 | Hardesty .................. | 250/227.11 |
| 5,525,430 | A * | 6/1996 | Chahroudi .................... | 428/620 |
| 6,419,306 | B2 | 7/2002 | Sano et al. | |
| 6,889,456 | B2 * | 5/2005 | Shibata et al. ................. | 40/546 |
| 6,971,758 | B2 | 12/2005 | Inui et al. | |
| 7,461,962 | B2 * | 12/2008 | Lee et al. ...................... | 362/613 |
| 7,549,776 | B2 * | 6/2009 | Maeda et al. ................. | 362/362 |
| 7,752,791 | B2 * | 7/2010 | Misawa et al. ................. | 40/546 |

(Continued)

FOREIGN PATENT DOCUMENTS

| | | |
|---|---|---|
| EP | 1988331 | 11/2008 |
| JP | 1-101287 A | 7/1989 |
| JP | 2000-292212 A | 10/2000 |
| JP | 2001-163117 | 6/2001 |
| JP | 2002-108257 A | 4/2002 |
| JP | 2002-279817 | 9/2002 |
| JP | 2005-55816 A | 3/2005 |
| JP | 2005-221661 | 8/2005 |
| JP | 2006-062431 | 3/2006 |
| JP | 2006-133415 A | 5/2006 |
| JP | 2007-218694 A | 8/2007 |
| JP | 3136395 B | 10/2007 |
| JP | 2007-294297 | 11/2007 |
| JP | 2007-316584 A | 12/2007 |

OTHER PUBLICATIONS

Notification of Reasons for Refusal dated Jan. 30, 2012 (with an English translation).

*Primary Examiner* — Hargobind S Sawhney
(74) *Attorney, Agent, or Firm* — McGinn IP Law Group, PLLC

(57) ABSTRACT

A scuff plate has a first light guide element having a groove of predetermined shape formed in an underside of the element when viewed from below, a first light source that guides light to the first light guide element, light emission unit that is disposed below the first light guide element and that upwardly emits light differing in color from the first light source, and a half mirror layer interposed between the first light guide element and the light emission unit. Light from the first light source is guided to the first light guide element, and the guided light undergoes reflective diffusion at the groove (a character section). As a consequence, a desired character, or the like, is luminously displayed. In the meantime, light generated by the light emission unit exits through the first light guide element, whereupon an area (a background area) other than the groove (the character section) is illuminated in color that differs from the color of light from the first light source.

14 Claims, 3 Drawing Sheets

(56) References Cited

U.S. PATENT DOCUMENTS

| | | |
|---|---|---|
| 7,798,659 B2 * | 9/2010 | Englander .................... 359/871 |
| 2002/0043012 A1 | 4/2002 | Shibata et al. |
| 2005/0068759 A1 * | 3/2005 | Takemoto et al. ............. 362/31 |
| 2005/0213351 A1 * | 9/2005 | Yang ............................ 362/633 |
| 2006/0021267 A1 * | 2/2006 | Matsuda et al. ................ 40/546 |
| 2007/0186843 A1 | 8/2007 | Tsurumi |
| 2008/0106187 A1 | 5/2008 | Suzuki et al. |
| 2008/0170405 A1 * | 7/2008 | Kamiya et al. ................ 362/495 |

* cited by examiner

SCUFF PLATE

BACKGROUND OF THE INVENTION

1. Field of the Invention

The present invention relates to a scuff plate that luminously displays a desired shape (a letter, a numeral, and the like).

2. Description of the Related Art

A scuff plate device for use in an automobile that yields a decorative effect by luminously displaying a character, and the like, has been put into practice. FIG. 6 shows an example of a related-art transmission, light-emitting scuff plate device 100. In the scuff plate device 100, a character plate 101 (e.g., an aluminum plate) punched into the shape of a desired character, and the like, is piled on a light guide plate 102. An underside of the light guide plate 102 is printed in white. A light source 103 is positioned at a place opposite an end face of the light guide plate 102. When the light source 103 is illuminated in such a scuff plate device 100, light is guided into the light guide plate 102 by way of its end face. The thus-guided light undergoes reflection on the underside of the light guide plate 102, whereby light oriented in an upper surface of the light guide plate 102 is produced. As a consequence, light is emitted from the upper surface of the light guide plate 102. The thus-emitted light reaches the character plate 101, and a portion of the light goes out by way of the punched areas formed in the character plate 101. The predetermined character, and the like, is luminously displayed through foregoing operation. In addition to the display device having the foregoing configuration, display devices with various contrivances have already been proposed (Patent Documents 1 through 4). For instance, in a scuff plate device described in Patent Document 1, only partial areas of the underside of the light guide plate are printed in white so as to correspond to punched areas of the character plate rather than the entire underside of the light guide plate being printed in white, thereby reducing the area of a light reflection region and illuminating a character, and the like, in a uniform quantity of light. In Patent Document 1, there is proposed a contrivance for creating a half-mirror layer on a light guide plate, thereby causing a character to be observed with a metallic taste when the device is not illuminated. Patent Document 5 describes a surface emitting device utilizing two light guide members. In the surface emitting device, two light guide members whose upper surfaces are partially roughened are superposed one on top of the other, and light is introduced into the respective light guide members. Portions (surface-roughened areas) of the upper surfaces of the respective light guide members are consequently illuminated, to thus emit light, and a luminous display in a desired shape, such as a check pattern, is provided. The surface emitting device is suitable for a simple luminous display, such as a luminous display of a predetermined pattern and a luminous display of one arrow on an entire light emitting surface, but is not suitable for a luminous display of a string of characters or figures, as in a scuff plate. In particular, a boundary between a luminous section and a non-luminous section is not structurally clear; hence, a character, a figure, and the like, cannot be clearly displayed.

Patent Document 1: JP-A-2001-163117
Patent Document 2: JP-A-2002-279817
Patent Document 3: JP-A-2005-221661
Patent Document 4: JP-A-2006-062431
Patent Document 5: JP-A-2007-294297

Against the backdrop, the challenge to be met by the present invention is to provide a scuff plate that yields high visibility as well as a superior decorative effect.

SUMMARY OF THE INVENTION

In order to solve the problem, the present invention is directed toward a scuff plate comprising:

a first light guide element having a groove of predetermined shape formed in an underside of the element when viewed from below;

a first light source that guides light to the first light guide element;

a light emission unit that is disposed below the first light guide element and that upwardly emits light differing in color from the first light source; and a half mirror layer interposed between the first light guide element and the light emission unit.

In a scuff plate of the present invention, a groove formed in an underside of a first light guide element forms a character section (a letter, a figure, a symbol, and the like). Light from the first light source is guided into the first light guide element, and guided light undergoes reflective diffusion at the character section. As a consequence, a desired character, or the like, is luminously displayed. In the meantime, light generated by the light emission unit exits through the first light guide element, and an area (background) of the plate except the character section is illuminated in color differing from the color of light from the first light source. Thus, the character section and its background are illuminated in two different colors of light, whereby a highly decorative effect is yielded. Further, the character section is formed from a groove, so that a clear luminous display whose contour does not become blurred is achieved.

In the meantime, when the scuff plate is in a nonluminous display state (when illuminance of the outside is high as in daytime and the like), external light is reflected by the half mirror layer, as a result of which both the character section and the background section are visually ascertained to be metallic. Thus a design totally differing from that achieved during luminous display of the scuff plate is produced, whereby there are yielded effects, such as presentation of a surprise, enhancement of a design, and affording of a sense of luxuriousness.

DESCRIPTION OF THE PREFERRED EMBODIMENTS

First Light Guide Element

Figure 1:
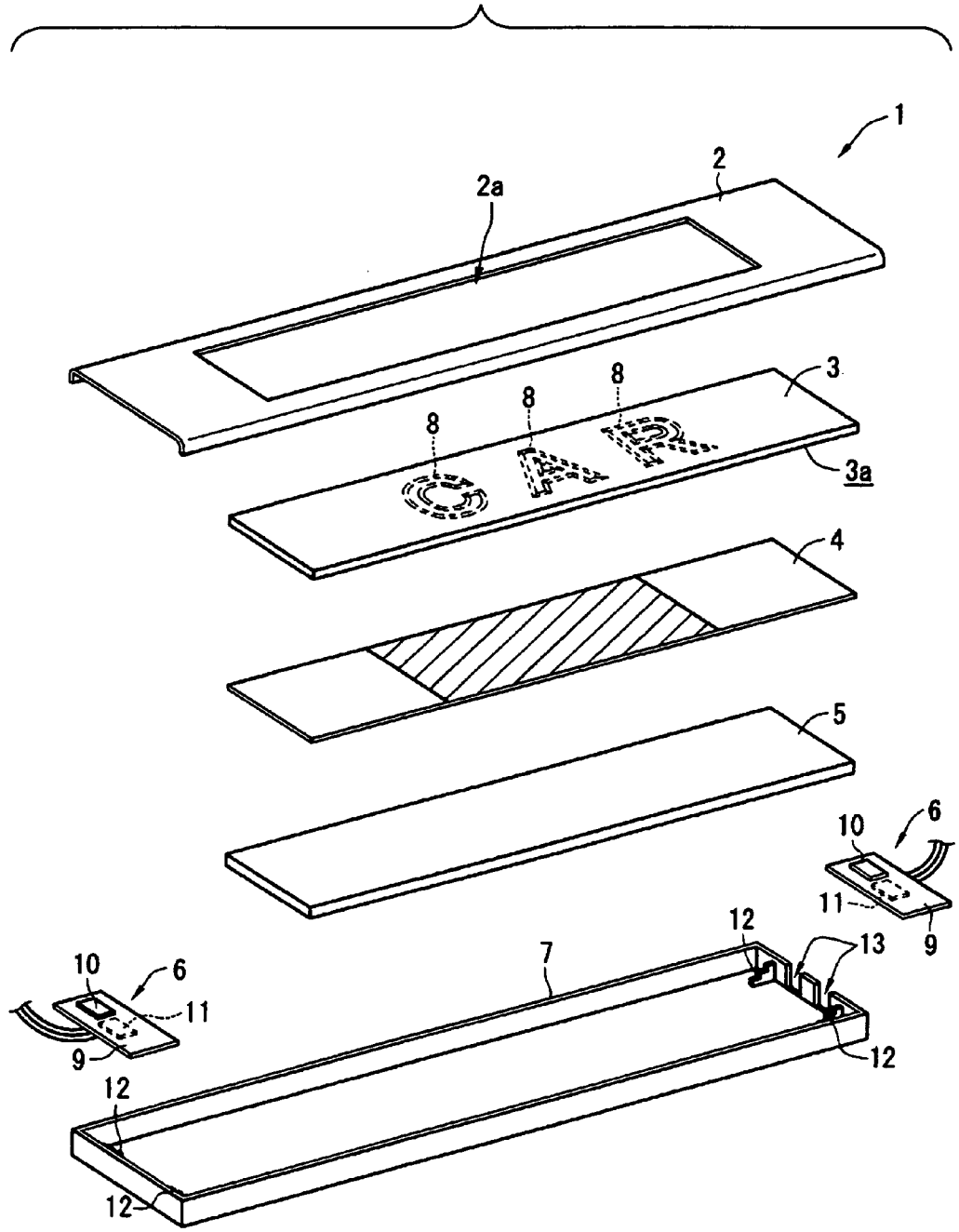
FIG. 1 is an exploded perspective view of a scuff plate 1 of an embodiment.

In order to luminously display a character, or the like, (a geometry intended to be luminously displayed, such as a desired numeral, character, symbol, and mark), a groove of predetermined shape is formed in an underside of a first light guide element when viewed from above. Accordingly, no specific limitation is imposed on geometries of grooves, so long as a desired character is luminously displayed as a result of light undergoing reflective diffusion on the grooves. Since the character section is formed from the grooves in the present invention, a luminous display with a clear contour can be effected by an edge effect (reflective diffusion of light caused by edges).

It is preferable to subject surfaces of the grooves to light-reflective diffusion treatment. The reason for this is that reflective diffusion of light caused by the grooves is promoted, thereby enabling lessening of the unevenness of brightness of a luminous display. Another reason for this is that the brightness of the luminous display can be enhanced. No limitations are particularly imposed on the type of light-reflective diffusion treatment. For instance, it is better to form crimps (minute irregularities) in the surfaces of the grooves. In order to luminously display a character, or the like, with uniform appearance, it is preferable to subject the entire grooves to uniform light-reflective diffusion treatment. In order to accomplish a specific objective (e.g., a partially-highlighted display), a change may also be intentionally imparted to the mode of the light-reflective diffusion treatment.

In order to enable efficient emission of light from an upper surface of the first light guide element, it is preferable to form a light reflection layer on end faces other than an end face that is to serve as a light guide section. A similar advantage can also be yielded by placing another member having light-reflective surfaces (e.g., a reflection plate formed from a white resin) in close contact with the end faces other than the end face to serve as a light guide section.

A material of the first light guide element is not particularly limited, so long as the material exhibits optical transparency. The first light guide element is preferably formed from a transparent material. The first light guide element is preferably formed from a material that is easy to process and that exhibits superior durability. A polycarbonate resin, an acrylic resin [a polymethyl methacrylate (PMMA) and the like], an epoxy resin, glass, and the like, can be mentioned as a specific example of a material of the first light guide element. Well-known ejection molding, and the like, can be adopted as a method for processing the first light guide element.

Light is guided from the end face to the first light guide element. In order to uniformly, luminously display a character section, light is preferably guided from at least two end faces (e.g., right and left end faces) or more. A configuration of the first light source for guiding light into the first light guide element will be described later.

(Light Emission Unit)

In the present invention, light emission unit is disposed at a position below the first light guide element. Light produced by the light emission unit is utilized for illumination of an area other than the character section (a background section), thereby contributing to enhancement of visibility of a design, a character, and the like. The color of light generated by the light emission unit is not particularly limited, so long as the color differs from the color of light from the first light source. For instance, the light emission unit is arranged so as to generate light whose color is complementary to the color of light from the first light source. The configuration enables realization of a luminous display whose character section exhibits high visibility. To place emphasis on the sense of unity between the character section and the background, light that is similar in color to the first light source may also be generated by the light emission unit.

A combination of a surface-shaped light emission element and a light control layer can be adopted as the light emission unit. The light control layer controls the color and/or amount of light emitted from the surface-shaped light emission element. For instance, a print layer produced by subjecting a front surface of a transparent sheet to color printing can also be used as a light control layer. A colored sheet or film may also be utilized as the light control layer.

Preferably, the light control layer is configured so as to block light traveling toward the grooves among the light emitted from the surface-shaped light emission element in such a way that the grooves (the character section) of the first light guide element are not exposed. The configuration makes it possible to increase contrast between the character section and the background in the vicinity of the character section, whereby the visibility of the character section is enhanced. For instance, the essential requirement is to produce a light control layer in such a way that light transparency of areas corresponding to the character section becomes low (preferably in such a way that light transparency comes to substantially zero).

In one mode, the light control layer controls the amount of light emitted from the surface-shaped light emission element in such a way that light radiated on an area spaced apart from the character section become greater than light radiated on an area close to the character section (groove) of the first light guide element in terms of the quantity of light. In the light control layer of the present embodiment, light transparency of the area close to the character section is smaller than light transparency of the area spaced apart from the character section.

In the meantime, the light control layer may also effect control in such a way that the color of light emitted from the surface-shaped light emission element continually or stepwise changes along a direction departing from the character section (groove) of the first light guide element. By means of the configuration, the background of characters is subjected to gradation illumination, thereby imparting the characters with a high design property. The light control layer having such a function can be produced by means of; for instance, gradation printing.

The surface-shaped light emission element is not particularly limited, so long as the element can produce surface-shaped light. For instance, a surface-shaped light emission element is made by combination of a light guide element with a light source. An example of the surface-shaped light emission element will be described hereunder in detail. In order to distinguish the surface-shaped light emission element from the first light guide element making up the character plate, a light guide element utilized for the surface-shaped light emission element is called a "second light guide element." Likewise, the light source utilized for the surface-shaped light emission element is called a "second light source."

Light from the second light source to be described later is guided to the second light guide element. An upper surface of the second light guide element acts as a light emission surface. Specifically, at least a portion of the guided light is emitted from the upper surface of the second light guide element. It is preferable to place a light-reflective diffusion layer at a position below the second light guide element in order to enable efficient emission of light from the upper surface and reduce the unevenness of brightness. The light-reflective diffusion layer reflects and diffuses light reaching an undersurface of the second light guide element (or emitted from the undersurface), thereby producing light toward the upper surface of the second light guide element. It is preferable to place the light-reflective diffusion layer in close contact with the undersurface of the second light guide element so as to be able to properly exhibit such a function. It is preferable to form a light reflection layer from a highly-reflective, highly-diffusive material so that superior reflective diffusion action is achieved. Typically, a light reflection layer is formed directly on the undersurface of the second light guide element. Such a light-reflective diffusion layer can be produced by means of: for instance, printing or application of white ink or paint, adhesion of a white seal or film, deposition of a metal material, adhesion of a seal or film having a metallic luster, and the like. Alternatively, a light-reflective diffusion layer can also be produced by roughening the undersurface of the second light guide element through a treatment, such as etching, sandblasting, and electro-discharge machining.

In effect, the essential requirement is that the above-mentioned layout of the light-reflective diffusion layer be achieved at the time of use of a scuff plate. For instance, a plate-shaped member exhibiting a superior reflective diffusion property (e.g., a metal plate such as an aluminum plate, a resin plate having a metal layer formed on its surface, and the like) is additionally prepared, and the scuff plate of the present invention can also be configured in such a way that the member is assembled while its surface remains in close contact with the rear surface of the second light guide element.

In order to enable more efficient radiation of light from the upper surface by preventing leakage of light from a surface other than the upper surface of the second light guide element, it is preferable to form a light-reflective diffusion layer on side surfaces (end faces) of the second light guide element or to place another member having surfaces of a light-reflective diffusion property (e.g., a reflection plate made of a white resin or metal) while remaining in close contact with side surfaces (end faces) of the second light guide element.

The material of the second light guide element is analogous to that of the first light guide element, and hence its explanation is omitted.

(First Light Source and Second Light Source)

Although the type of the first and second light sources is not particularly limited, using an LED lamp as a light source is preferable for reasons of its compactness, low power consumption, and long life. LED lamps of various types, such as a shell type, a chip type, and the like, can be adopted. The amount of heat generated by a light source is reduced as a result of the LED lamps being taken as the light source, which in turn yields an advantage of a reduction in thermal influence on members located around the light source.

The luminescent color of the LED lamp is not particularly limited, as well. LED lamps of different luminescent colors can be used in combination. When a plurality of LED lamps are used, light of various luminescent modes can be emitted by controlling luminous states of the respective LED lamps. For instance, LED lamps of red, green, and blue colors are adopted, and the respective LED lamps are controlled in relation to a luminous state and the quantity of light, whereby a variety of colors can be illuminated. The number of LED lamps to be employed can be comprehensively determined by taking into consideration the size of a compatible light guide element, desired brightness, and the like.

In one mode, side-view type LED lamps are adopted as the first and second light sources. In addition, a double-sided printed circuit board is adopted as a mount board. Specifically, an LED lamp serving as the first light source is mounted on one surface of the double-sided printed circuit board, and another LED lamp serving as the second light source is mounted on the other surface. Thus, a scuff plate is miniaturized by arranging the first and second light sources as a single light source unit. Since the number of components is reduced, the configuration is also desirable in view of assembly operation.

(Half Mirror Layer)

A half mirror layer is interposed between the first light guide element and the light emission unit. When the scuff plate of the present invention is in a nonluminous state (in the case of high illuminance achieved in the outside as in daytime, and the like), both the character section and the background are viewed with a metallic taste by means of the action of the half mirror. Thus, a metallic-colored unique design is thus made. Deterioration of the nature of the design, which would otherwise be caused when the interior of the scuff plate is observed, is prevented by a half-mirror action.

In the meantime, when the scuff plate of the present invention is in a luminous state, the character section is illuminated by light from the first light source, and light from the light emission unit upwardly goes out of the half mirror layer, whereupon the background of the character section is also illuminated. When the scuff plate changes from the nonluminous state to the luminous state as mentioned above, a drastic change thus occurs in the design of the scuff plate. A surprise is thereby presented.

The half mirror layer can be made by use of; for instance, a metal layer (Al, Ag, Au, and the like) of predetermined film thickness. The half mirror layer can also be formed by sequentially stacking a metal layer and a protective layer made of an optically-transparent resin, and the like, one on top of the other. An example method for forming such a half mirror layer is provided. First, a metal layer is formed from an Al thin film. The metal layer is given a thickness that brings about a half mirror effect. For instance, the metal layer can be provided with a thickness that achieves a light transmittance of about 15 to 20%. Subsequently, the metal layer is overlaid with a transparent resin, such as an epoxy resin, by printing, coating, and the like, to thus produce a protective layer. The configuration of the half mirror layer and a method for forming the half mirror layer are not limited to those mentioned above, and other known configurations and methods can be adopted. Moreover, an ink layer is provided on the surface of the protective layer or between the metal layer and the protective layer. The ink layer can be formed by printing, coating, and the like, of color ink; for instance, yellow ink.

Embodiment

Figure 2:
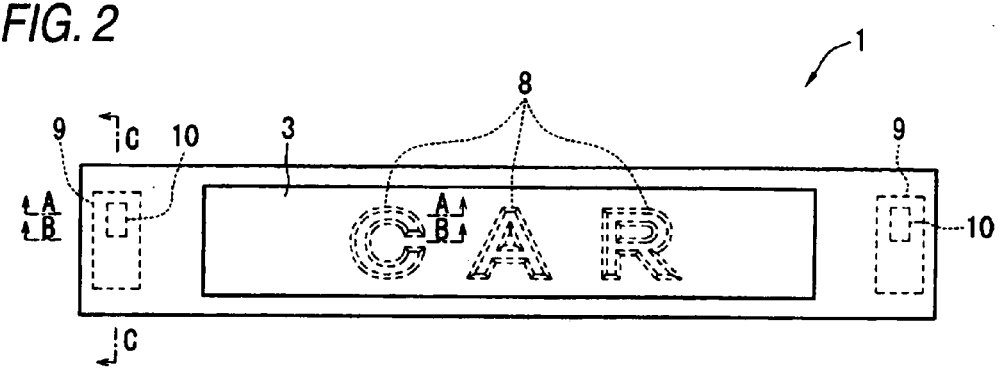
FIG. 2 is a plan view of the scuff plate 1.
Figure 3:
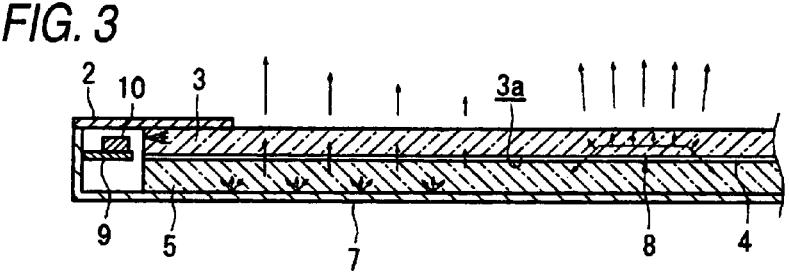
FIG. 3 is a cross-sectional view taken at a position of line A-A shown in FIG. 2.
Figure 4:
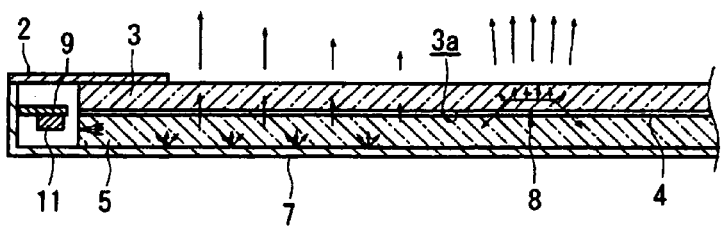
FIG. 4 is a cross-sectional view taken at a position of line B-B shown in FIG. 2.
Figure 5:
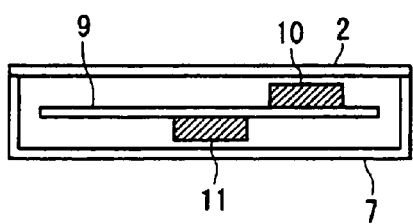
FIG. 5 is a cross-sectional view taken at a position of line C-C shown in FIG. 2.
Figure 6:
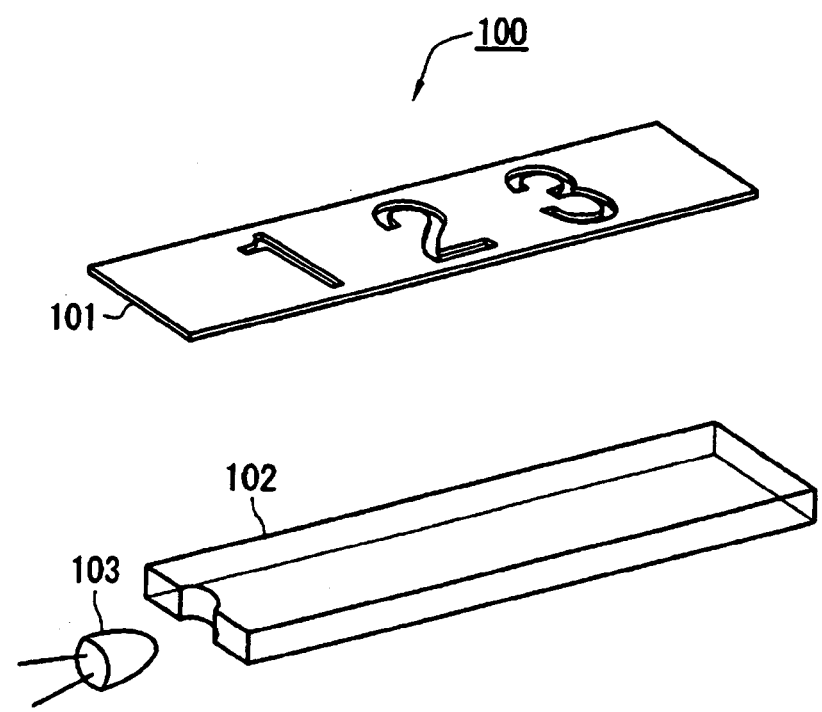
FIG. 6 is an example of a related-art transmission light emitting scuff plate.

FIGS. 1 through 5 show a scuff plate 1 that is an embodiment of the present invention. FIG. 1 is an exploded perspective view of the scuff plate 1; FIG. 2 is a plan view of the same; FIG. 3 is a cross-sectional view taken along line A-A shown in FIG. 2; FIG. 4 is a cross-sectional view taken along line B-B; and FIG. 5 is a cross-sectional view taken along line C-C. The configuration of the scuff plate 1 and a display mode of the same are now described hereunder by reference to the drawings.

The scuff plate 1 is made up of a cover 2, a character plate 3, an optical sheet 4, a light guide plate 5, a pair of light source units 6, and a case 7. The character plate 3, the optical sheet 4, and the light guide plate 5 are housed in the case 7 in a piled manner. When the scuff plate is housed in the case 7, the optical sheet 4 is arranged below the character plate 3, and the light guide plate 5 is arranged below the optical sheet 4. The light source units 6 are housed at respective right and left ends within the case 7. When the scuff plate 1 is assembled, the members are housed in the case 7, and the cover 2 is put on the character plate 3 from above.

The cover 2 is made of stainless steel (SUS) and has a thickness of about 0.5 mm. An opening 2a is formed in the cover 2 in its longitudinal direction. A luminous display, which will be described later, is visually observed through the opening 2a. The cover 2 acts as a protective member, as well as serving as an important element that makes up the design of the scuff plate 1. In the present embodiment, stainless steel is employed as a material for the cover 2 as mentioned above so as to match a metallic color tone and texture produced by the half mirror layer to be described later.

The character plate 3 is a light guide plate (having at thickness from about 3 mm to 5 mm) whose upper surface is tapered to the viewer and that assumes a square shape when viewed from above, and a material of the character plate 3 is an acrylic resin. Grooves are formed in an underside 3a of the character plate 3 so as to make a desired geometry when viewed from above (a letter CAR in the embodiment). Crimps are formed in the surfaces of the grooves. The grooves correspond to the character section 8.

The optical sheet 4 is produced by forming a half mirror layer on an upper surface of a transparent sheet and printing an undersurface of the sheet in color; and is broadly made up of three layers (a half mirror layer, a transparent layer, and a color-printed layer).

The half mirror layer is produced by deposition of Al and assumes a uniform thickness over the entire half mirror layer. In the meantime, color printing is effected such that gradations are made. Specifically, printing is performed in blue-based ink such that light transmittance becomes greater from the center to an end. A center area of the optical sheet 4 situated below the character section 8 of the character plate 3 (an area with diagonal lines in FIG. 1) is arranged so as to be able to substantially block the whole of light emitted from the blow when the scuff plate 1 is in a luminous state.

The light guide plate 5 is made of an acrylic resin as in the case with the character plate 3. In the present embodiment, the thickness of the light guide plate 5 is set to about 2 mm. An underside of the light guide plate 5 may also be subjected to light-reflective diffusion treatment.

In the light source unit 6, two LED lamps 10 and 11 are implemented on each of the double-sided printed circuit boards 9. The LED lamp 10 implemented on an upper surface of the double-sided printed circuit board 9 is for guiding light to the character plate 3 and placed at a position that slightly deviates from the center of the mount printed circuit board 9 as shown in FIGS. 2 and 5. In the scuff plate 1, an exit plane of the LED lamp 10 opposes a position (an end face of a thick portion) slightly deviating from the center of the end face of the character plate 3. In the meantime, the LED lamp 11 (for guiding light into the light guide plate 5) mounted on the underside of each of the double-sided printed circuit boards 9 is implemented at a substantially-center position on the mount printed circuit board 9. Both the two LED lamps 10 and 11 are white-light producing side-view type LED lamps.

When the scuff plate is mounted in the vehicle, power is supplied to the respective LED lamps by way of a harness. An unillustrated power source control circuit is connected to the respective LED lamps, and the respective LED lamps are subjected to illumination control synchronized with; for instance, side marker lamps.

In the present embodiment, the number of LED lamps used for each light source unit is set to two. The number of LED lamps can be increased or decreased, as required. Further, there can be adopted various light guide methods, such as guiding of light from either of lateral sides, guiding of light from an upper side and/or a lower side in addition to the lateral sides, and the like, rather than guiding of light from both lateral sides as in the embodiment.

The case 7 is made of a white resin, and bosses 12 for positioning an article to be housed (the character plate 3 or the like) are provided at each end of the case. Reference numeral 13 designates an opening for a harness of the light source units 6.

A display mode of the scuff plate 1 will be subsequently described. First, when illuminance of the outside is high as in daytime, the scuff plate 1 enters a nonluminous state (the light source units 6 are extinguished). At this time, external light is reflected by the scuff plate by means of the action of the half mirror layer of the optical sheet 4. A portion of resultantly-produced light undergoes reflective diffusion on the character section 8 of the character plate 3 and subsequently exits from the upper surface of the character plate 3. On account of such action of the half mirror layer and reflective-diffusion action of the character section 8, a design observed through the opening 2a of the cover 2 exhibits a metallic color taste and texture as a whole, and the character section 8 (the letter CAR) is visually ascertained.

In the meantime, in a case where the light source units 6 are illuminated in synchronism with illumination of the side marker lamps when illuminance of the outside is low as in nighttime (in an illuminated state of the scuff plate 1), white light is produced by the respective two LED lamps 10 and 11 in the light source unit 6. The white light produced by the LED lamp 10 is radiated on end faces of the character plate 3, as a result of which white light is guided into the character plate 3. The white light reaches the character section 8, where the light undergoes reflective diffusion. Since the character section 8 is made up of the crimped grooves, the entirety of the character section 8 is illuminated, and edges of the character section are illuminated with high brightness. The white light produced by the other LED lamp 11 in the light source unit 6 is radiated on the end face of the light guide plate 5 and taken into the light guide plate 5. Since the case 7 made of a white resin is disposed on the underside of the light guide plate 5, the thus-guided white light undergoes reflective diffusion on the underside of the light guide plate. Consequently, upwardly traveling light rises. After having exited from the upper surface of the light guide plate 5, the light enters the color-printed layer of the optical sheet 4 and upwardly travels after undergoing color conversion in the color-printed layer. Since the color-printed layer is formed by blue-color-based gradation printing as mentioned above, the light passed through the color-printed layer comes into blue-color-based light. Moreover, the color tone of light changes with an increasing distance from the character section 8. The brightness of light decreases with an increasing distance from the character section 8. In the meantime, light is blocked by the area of the color-printed layer located below the character section 8 of the character plate 3. Consequently, light does not fall on the character section 8 from below.

As a consequence of occurrence of the above actions, the letter CAR is luminously displayed in white light through the opening 2a of the cover 2 when the scuff plate 1 is illuminated, and blue light, which becomes brighter with an increasing distance from the character section 8 and which is produced from the background of the character section 8, is observed. Thus, presentation is provided by light that differs in color from the character section 8 and that gradually changes in terms of color tone and brightness, whereby a highly decorative effect is yielded. The contrast of the character section 8 is enhanced by combination of the shielding effect yielded by the color-printed layer and the edge effect resultant from the character section 8 being formed from the grooves, and a contour does not become blurred, so that an extremely-clear luminous display is produced. Moreover, when the scuff plate is an unilluminated state (the metallic-tone design produced by the half mirror layer appears), a totally different design is produced. Hence, advantages, such as presentation of a surprise, enhancement of a design property, and affording of a sense of luxuriousness, are yielded.

In the scuff plate 1, the upper surface of the character plate 3 is tapered toward the viewer, and light from the LED lamps 10 is guided not from the centers of the end faces of the character plate 3 but from positions on the back that would be thick. Hence, light easily spreads over the entirety of the character section 8. Thus, a desired character can be luminously displayed with uniform brightness.

Since each of the light source units 6 is made up of the double-sided printed circuit board 9 and the side-view type LED lamps 10 and 11, one being mounted on the upper surface of the printed circuit board and the other being mounted on the underside of the same, a very thin scuff plate is obtained. As mentioned above, the configuration of the present invention is suitable for a reduction in thickness.

In the scuff plate 1, the half mirror layer and the color-printed layer are integrally formed, but they may also be provided separately. For example, a combination of a half mirror film with a color-printed transparent sheet can be adopted. A color-printed layer (and a half mirror layer) can also be formed on the surface of the light guide plate 5.

In the scuff plate 1, the color-printed layer exhibiting a gradation effect is formed; however, the present invention is not limited to the color-printed layer. For instance, multicolor printing can also be adopted such that the color of emitted light changes from one location to another. Moreover, light that runs from the neighborhood of the character section 8 to the outside is produced in the scuff plate 1. However, discontinuous illumination may also be caused by partially imparting a shielding effect to the color-printed layer.

A color film may also be used in place of the color-printed layer.

In the scuff plate 1, all characters are displayed in a single pattern. However, a display pattern abounding in more variety can be implemented by making a contrivance to the method for generating the character section 8. For example, a display pattern in which an illumination pattern changes from one character to another is obtained by changing the reflective-diffusion processing method on a per-character basis.

Although the example to which the present invention is applied has been described thus far by use of the scuff plate, the present invention can also be applied to another decorating device for use in an interior of an automobile [e.g., a plate-shaped decorating (illuminating) device to be attached to doors, a line-shaped decorating (illuminating) device attached to a pillar, and the like]. The present invention is applicable not only to an automobile use but also to decoration of display plates of various vehicles, decoration of a display plate in an interior of a residence, and decoration of a display plate to be disposed on an exterior of a residence, such as a name plate.

The present invention is not limited to the descriptions about the mode of implementation of the present invention and the embodiment of the same. Various modified embodiments also fall within the present invention without departing from descriptions about the scope of the invention and within the range where the modifications are readily conceivable for the artisans skilled in the art.

Details of theses, publications of unexamined patent applications, patent gazettes, and the like, are incorporated herein by reference.

What is claimed is:

1. A scuff plate, comprising:
   a first light guide element having a groove of a predetermined shape formed in an underside of the first light guide element when viewed from below;
   a first light source that emits light to the first light guide element;
   a surface-shaped light emission element that is disposed below the first light guide element and that upwardly emits light differing in color from that of the first light source, the surface-shaped light emission element illuminating a background section that surrounds the groove; and
   a half mirror layer interposed between the first light guide element and the surface-shaped light emission element, said half mirror layer being disposed on an upper surface of a transparent sheet that comprises a color-printed layer disposed on an undersurface thereof,
   wherein the first light source is mounted on an upper surface of a circuit board that laterally extends in a direction of an extension of the half mirror layer,
   wherein the surface-shaped light emission element comprises a light control layer that controls at least one of a color and an amount of light exited from the surface-shaped light emission element,
   wherein the surface-shaped light emission element comprises a second light guide element and a second light source that guides light into the second light guide element,
   wherein the first light source and the second light source each comprises a side-view type LED lamp, and
   wherein the circuit board comprises a double-sided printed circuit board, and the second light source is mounted on a bottom surface of the double-sided printed circuit board, thereby making up a single light source unit.

2. The scuff plate according to claim 1, wherein crimps are formed in a surface of the groove.

3. The scuff plate according to claim 1, wherein the light control layer blocks light traveling toward the groove in the light exited from the surface-shaped light emission element.

4. The scuff plate according to claim 1, wherein the light control layer adjusts the amount of light exited from the surface-shaped light emission element such that light radiated on an area distant from the groove becomes greater in quantity than light radiated on an area close to the groove.

5. The scuff plate according to claim 1, wherein the light control layer adjusts the color of light exited from the surface-shaped light emission element in such a way that the color of light continually or stepwise changes in a direction departing from the groove.

6. The scuff plate according to claim 1, wherein the surface-shaped light emission element comprises a light control layer, in said light control layer, a light transparency of an area close to the groove being smaller than a light transparency of an area spaced apart from the groove.

7. The scuff plate according to claim 1, wherein in the color-printed layer, a light transmittance becomes greater from a center to an end of the color-printed layer.

8. A scuff plate, comprising:
   a first light guide element having a groove of a predetermined shape formed in an underside of the first light guide element when viewed from below;
   a first light source that emits light to the first light guide element;
   a surface-shaped light emission element that is disposed below the first light guide element and that upwardly emits light differing in color from that of the first light source, the surface-shaped light emission element illuminating a background section that surrounds the groove; and a half mirror layer interposed between the first light guide element and the surface-shaped light emission element, said half mirror layer being disposed on an upper surface of a transparent sheet that comprises a color-printed layer disposed on an undersurface thereof, wherein the first light source is mounted on an upper surface of a circuit board that laterally extends in a direction of an extension of the half mirror layer, wherein the surface-shaped light emission element comprises a second light guide element and a second light source that guides light into the second light guide element, and wherein the circuit board comprises a double-sided printed circuit board, and the second light source is mounted on a bottom surface of the double-sided printed circuit board to form a single light source unit.

9. The scuff plate according to claim 8, wherein the surface-shaped light emission element further comprises:
   a light control layer that controls at least one of a color and an amount of light exited from the surface-shaped light emission element.

10. The scuff plate according to claim 8, wherein the first light source and the second light source comprise a side-view type LED lamp.

11. The scuff plate according to claim 8, wherein the first light source is mounted at a position that slightly deviates from a center of the double-sided printed circuit board, and the second light source is mounted at substantially the center of the double-sided printed circuit board.

12. A scuff plate, comprising:
   a first light guide element having a groove formed in an underside of the first light guide element;
   a first light source that emits light toward the first light guide element;
   a light emission unit that is disposed below the first light guide element and that upwardly emits light differing in color from that of the first light source said light emission unit comprising a second light guide element and a second light source that guides light into the second light guide element; and
   a half mirror layer interposed between the first light guide element and the light emission unit,
   wherein the first light source is mounted on an upper surface of a circuit board that laterally extends in a direction of an extension of the half mirror layer, and
   wherein the circuit board comprises a double-sided printed circuit board, and the second light source is mounted on a bottom surface of the double-sided printed circuit board to form a single light source unit.

13. The scuff plate according to claim 12, wherein the light emission unit further comprises:
   a surface-shaped light emission element comprising the second light guide element and the second light source; and
   a light control layer that controls at least one of a color and an amount of light exited from the surface-shaped light emission element.

14. The scuff plate according to claim 12, further comprising an optical sheet comprising:
   said half mirror layer;
   a transparent sheet on an upper surface of which said half mirror layer is disposed; and
   a color-printed layer disposed on an undersurface of the transparent sheet.

* * * * *